(12) United States Patent
Noguchi

(10) Patent No.: US 7,345,720 B2
(45) Date of Patent: Mar. 18, 2008

(54) LIQUID CRYSTAL DISPLAY DEVICE WITH A PLURALITY OF DIFFUSION REFLECTORS

(75) Inventor: Koji Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/855,156

(22) Filed: May 27, 2004

(65) Prior Publication Data

US 2004/0263727 A1  Dec. 30, 2004

(30) Foreign Application Priority Data

Jun. 4, 2003  (JP) .............................. 2003-159600

(51) Int. Cl.
*G02F 1/1335* (2006.01)

(52) U.S. Cl. ..................... 349/114; 349/113; 349/106

(58) Field of Classification Search ........ 349/113–114, 349/106
See application file for complete search history.

(56) References Cited

U.S. PATENT DOCUMENTS

| | | | |
|---|---|---|---|
| 6,259,500 B1 * | 7/2001 | Kijima et al. ............... | 349/113 |
| 6,281,952 B1 * | 8/2001 | Okamoto et al. ............. | 349/12 |
| 6,501,521 B2 * | 12/2002 | Matsushita et al. ......... | 349/106 |
| 6,912,027 B2 * | 6/2005 | Kim ............................ | 349/114 |
| 6,914,656 B2 * | 7/2005 | Sakamoto et al. ........... | 349/141 |
| 2002/0054269 A1 * | 5/2002 | Maeda et al. ................ | 349/181 |
| 2006/0250550 A1 * | 11/2006 | Tanaka et al. ............... | 349/114 |

FOREIGN PATENT DOCUMENTS

| | | |
|---|---|---|
| JP | 1999-183892 | 7/1999 |
| JP | 2000-305099 | 11/2000 |
| JP | 2000-321564 | 11/2000 |
| JP | 2001-075091 | 3/2001 |
| JP | 2002-341366 | 11/2002 |
| JP | 2003-140130 | 5/2003 |

OTHER PUBLICATIONS

Japanese Patent No. 2003-159600 dated Nov. 10, 2006.
Office Action for application No. JP 2003-159600 dated Jan. 31, 2007.

* cited by examiner

*Primary Examiner*—David Nelms
*Assistant Examiner*—Richard H Kim
(74) *Attorney, Agent, or Firm*—Sonnenschein Nath & Rosenthal LLP

(57) ABSTRACT

A transflective liquid crystal display device, improved in luminance and contrast to improve the viewability and the color reproducibility in color display better, having scattering diffusion reflectors formed at a first transparent substrate and a transparent window formed at the first transparent substrate surrounding the diffusion reflectors in an unevenness distribution. Since the easily regular reflecting regions around the diffusion reflectors are formed with the transparent window, both the reflectance of diffused and reflected front light and the transmittance of back light can be improved.

7 Claims, 7 Drawing Sheets

LIQUID CRYSTAL DISPLAY DEVICE WITH A PLURALITY OF DIFFUSION REFLECTORS

RELATED APPLICATION DATA

The present application claims priority to Japanese Application(s) No(s). P2003-159600 filed Jun. 4, 2003, which application(s) is/are incorporated herein by reference to the extent permitted by law.

BACKGROUND OF THE INVENTION

1. Field of the Invention

The present invention relates to a liquid crystal display device, more particularly relates to a liquid crystal display device in which a reflective display and transmissive display are jointly used.

2. Description of the Related Art

Liquid crystal display devices have the advantages of thinness, light weight, and low power consumption compared with cathode ray tubes (CRT) and are utilized for personal computers, mobile phones, or other displays of electronic equipment.

Liquid crystal display devices are roughly divided into transmissive types and reflective types. Liquid crystal display devices differ from CRTs in that they are not self-luminescence type display devices. Therefore, a transmissive liquid crystal display device is provided with a planar light source called a "backlight" at its back surface and passes light from the backlight to a liquid crystal panel for display. Since a transmissive liquid crystal display device displays an image using the backlight, it remains unaffected even when the intensity of the ambient light is weak and can display an image with a high luminance and high contrast. However, the backlight consumes over 50% of the entire power consumption of a liquid crystal display device, so a transmissive liquid crystal display device suffers from the disadvantage that it is hard to reduce the power consumption. If the intensity of the ambient light is strong, a transmissive liquid crystal display device has the disadvantages that the display appears dark and the viewability deteriorates.

On the other hand, with a reflective liquid crystal display device, ambient light is used as the light source. The ambient light is received and reflected at the front by a reflecting plate etc. The reflected light is passed through the liquid crystal panel for display. The point light source constituted by the ambient light has to be converted to a planar light source on the display panel, so the reflecting plate has a rough surface so as to diffuse and reflect the light. Such a reflective liquid crystal display device differs from a transmissive liquid crystal display device in that it does not use a backlight, so it has the advantage of a lower power consumption. However, if the surroundings are dark, the reflected light is weak and so has a great effect. The disadvantages may arise of an insufficient luminance and contrast and deteriorated viewability. Particularly, in the case of color display, the efficiency of utilization of the reflected light ends up falling at the color filter, so the viewability remarkably deteriorates.

For overcoming the above disadvantages of a transmissive and a reflective liquid crystal display device, Japanese Unexamined Patent Publication (Kokai) No. 2001-318377 discloses a transflective liquid crystal display device using both transmission and reflection. A transflective liquid crystal display device displays an image by utilizing the reflection of ambient light in a bright place or utilizing a backlight in a dark place.

FIGS. 1A and 1B show a transflective liquid crystal display device of the related art. Specifically, FIG. 1A is a plane view of the surface of a first transparent substrate 101, and FIG. 1B is a cross-sectional view of the first transparent substrate 101 and a second transparent substrate 111 facing the first transparent substrate 101 along the line X-X of FIG. 1A.

As shown in FIGS. 1A and 1B, the transflective liquid crystal display device has the first transparent substrate 101, the second transparent substrate 111, a liquid crystal layer 131, a diffusion-reflecting region 102, a transparent region 103, and a color filter 140. The first transparent substrate 101 is facing and arranged to the second transparent substrate 111. The liquid crystal layer 131 is arranged between the first transparent substrate 101 and the second transparent substrate 111. The first transparent substrate 101 is formed with the transparent region 103 and the diffusion-reflecting region 102 in parallel.

The diffusion-reflecting region 102 of the first transparent substrate 101 is a region diffusing and reflecting ambient light. It diffuses and reflects front light incident from the second transparent substrate 111 side via the liquid crystal layer 131. When viewing a display formed by reflected light, ambient light incident with an angle of about 20 to 30 degrees with respect to the direction perpendicular to the surface of the first transparent substrate 101 is diffused and reflected at the front for enabling viewing of the display. The diffusion-reflecting region 102 diffuses and reflects light by forming on a flat first reflecting underlayer 121 formed on the first transparent substrate 101 a curved second reflecting underlayer 122 in an unevenness distributed configuration. The first reflecting underlayer 121 and the second reflecting underlayer 122 is covered by forming a flat reflecting film 123b and a curved bumpy reflecting film 123a. The surface is therefore formed with relief shapes. Note that, in the case of forming a thin film transistor LCD (hereinafter called a "TFT-LCD"), the reflecting film 123 of the diffusion-reflecting region 102 may be formed as reflective electrodes connected to drain electrodes of the TFTs using silver etc.

The transparent region 103 is a region passing light incident from the backlight. The backlight is provided at the other surface of the first transparent substrate 101 than the surface where the liquid crystal layer 131 is arranged. Light emitted from the backlight passes though the transparent region 103. Note that the transparent region 103 may be formed with transparent electrodes connecting to the drain electrodes of TFTs by using indium tin oxide (hereinafter called as "ITO") in the case of a TFT LCD.

The color filter 140 is formed at the entire region of the second transparent substrate 111 facing the diffusion-reflecting region 102 and the transparent region 103 of the first transparent substrate 101. The color filter 140 passes and colors front light and back light.

The transflective liquid crystal display device of the related art is formed with the diffusion-reflecting region 102 and the transparent region 103 in parallel. The transflective liquid crystal display device of the related art has the diffusion-reflecting region 102 narrower than the reflective type and the transparent region 103 narrower than the transmissive type. Therefore, the transflective liquid crystal display device has the disadvantages of lower luminance and contrast and deteriorated viewability compared with a reflective or transmissive liquid crystal display device when used under ordinary conditions.

The diffusion-reflecting region 102 of the transflective liquid crystal display device of the related art reflects front light incident from the second transparent substrate 111 side via the liquid crystal layer 131 and displays the reflected light via the liquid crystal layer 131. Therefore, front light passes though the liquid crystal layer 131 a total of two times. On the other hand, the transparent region 103 passes the back light from the first transparent substrate 101 side to the liquid crystal layer 131 for the display. Therefore, the back light passes though the liquid crystal layer 131 just one time. In the case of color display, similarly, front light reflected at the diffusion-reflecting region 102 passes though the color filter 140 two times, while back light passing though the transparent region 103 passes though the color filter 140 one time. Therefore, when the liquid crystal layer 131 between the diffusion-reflecting region 102 and the transparent region 103 is a constant distance, the diffusion-reflecting region 102 has a light path longer than the transparent region 103. Therefore, a deterioration in luminance occurs. In particular, in color display, the color filter 140 may cause extreme deterioration in the viewability, insufficient color reproducibility, and unpractical display. Further, trying to obtain sufficient color reproducibility by providing the color filter 140 with in-plane differences in coloring concentration corresponding to the diffusion-reflecting region 102 and transparent region 103 requires a fine-machining and therefore a drop in the production efficiency.

SUMMARY OF THE INVENTION

An object of the present invention is to provide a liquid crystal display device improved in luminance and contrast to enable better viewability and color reproduction and able to improve the production efficiency.

To achieve the above object, there is provided a liquid crystal display device having a first transparent substrate, a second transparent substrate facing and arranged to the first transparent substrate, and a liquid crystal layer arranged between the first transparent substrate and the second transparent substrate, in the first transparent substrate, a plurality of diffusion reflectors for diffusing and reflecting front light incident from the second transparent substrate side via the liquid crystal layer being formed in an unevenness distribution and a transparent window for passing light surrounding the diffusion reflectors being formed.

Due to the above, the liquid crystal display device of the present invention diffuses and reflects front light incident from the second transparent substrate side via the liquid crystal layer by the diffusion reflectors formed at the first transparent substrate in an unevenness distribution. The transparent window formed at the first transparent substrate surrounding the diffusion reflectors in an unevenness distribution pass the light. The transparent window is formed at the easily regular reflecting regions surrounding the diffusion reflectors. Since the regular reflecting regions do not contribute much at all to the reflectance for display, the reflectance of the diffused and reflected front light and the transmittance of back light can be improved together.

BRIEF DESCRIPTION OF THE DRAWINGS

These and other objects and features of the present invention will be described in more detail with reference to the accompanying drawings, in which:

FIG. 6B is a plane view of a surface of a second transparent substrate of the liquid crystal display device according to a third embodiment of the present invention.

DESCRIPTION OF THE PREFERRED EMBODIMENTS

Preferred embodiments of the present invention will be described in detail below while referring to the attached figures.

First Embodiment

Figure 2A:
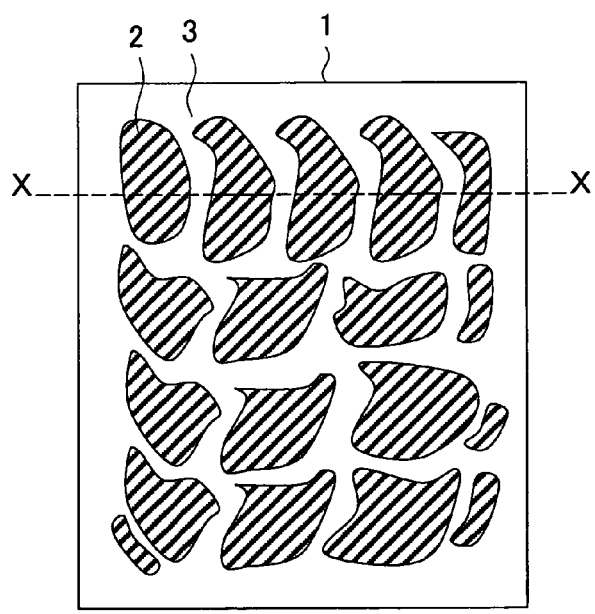
FIG. 2A is a plane view of a surface of a first transparent substrate of a liquid crystal display device according to a first embodiment of the present invention.
Figure 2B:
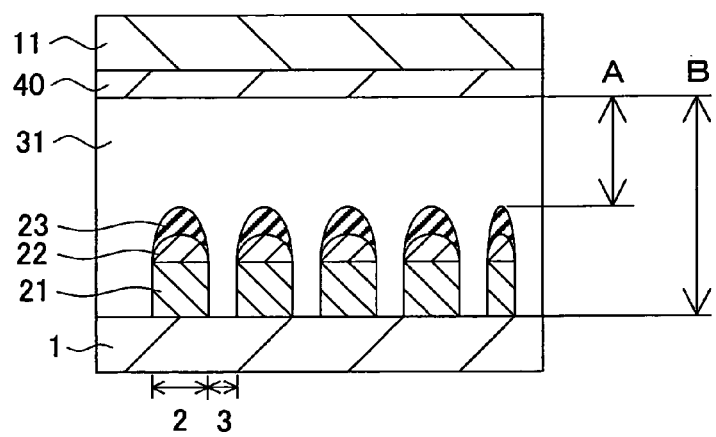
FIG. 2B is a cross-sectional view along the line X-X of FIG. 2A.

FIGS. 2A and 2B are views of a liquid crystal display device of a first embodiment. Specifically, FIG. 2A is corresponding to a pixel of the liquid crystal display device and a plane view of a surface of a first transparent substrate 1, while FIG. 2B is a cross-sectional view of the first transparent substrate 1 and a second transparent substrate 11 facing the first transparent substrate 1 along the line X-X of FIG. 2A. Note that, the liquid crystal display device of the present embodiment is arranged with a polarity of above pixels in a matrix.

Although not shown in FIGS. 2A and 2B, the first transparent substrate 1 is formed with TFTs. For example, the TFTs have bottom gate structures. In addition, the first transparent substrate 1 is formed with scan interconnects connecting to gate electrodes of the TFTs and signal interconnects connecting to source electrodes of the TFTs perpendicularly. Drain electrodes of the TFTs are connected to ITO pixel electrodes formed at the first transparent substrate 1 in a matrix. Therefore, the first transparent substrate 1 is formed with TFTs and acts as a TFT array. The other side of the first transparent substrate 1 facing the surface where the liquid crystal layer 31 is arranged is provided with a quarter wave plate and a polarizing plate and is provided with a backlight supplying back light via the quarter wave plate and polarizing plate. The second transparent substrate 11 is formed with ITO counter electrodes facing the pixel electrodes. The other surface of the second transparent substrate 11 than the surface where the liquid crystal layer 31 is arranged is provided with a quarter wave plate and polarizing plate successively.

As shown in FIGS. 2A and 2B, the liquid crystal display device of the present invention has the first transparent substrate 1, the second transparent substrate 11, the liquid crystal layer 31, diffusion reflectors 2, a transparent window 3, and a color filter 40. The second transparent substrate 11 is facing and arranged to the first transparent substrate 1, while the liquid crystal layer 31 is arranged between the first transparent substrate 1 and the second transparent substrate 11. The first transparent substrate 1 is formed with the diffusion reflectors 2 and the transparent window 3.

The first transparent substrate 1 is formed by glass or another transparent material so as to pass light. The second transparent substrate 11, similar to the first transparent substrate 1, is formed by glass or another transparent material so as to pass light.

The liquid crystal layer 31 is mainly formed by nematic liquid crystals and is sealed between the first transparent substrate 1 and the second transparent substrate 11 while a predetermined distance is maintained by spacers. The first transparent substrate 1 and the second transparent substrate 11 are provided with polyimide or other orientation layers (not shown). The liquid crystal layer 31 is oriented between the orientation layers. The liquid crystal layer 31 is supplied with voltage between the pixel electrodes and the counter electrodes using the TFTs as switching elements to change in crystal orientation and display an image.

The diffusion reflectors 2 diffuse and reflect ambient light, that is, front light incident from the second transparent substrate 11 side via the liquid crystal layer 31. In the present embodiment, a plurality of diffusion reflectors 2 are formed at the first transparent substrate 1 in an unevenness distribution so as to diffuse and reflect light as shown in FIG. 2A. The shapes and arrangement of the diffusion reflectors 2 are not particularly limited, but moire may occur if arranging regular shapes at regular intervals. Therefore, the diffusion reflectors 2 are preferably made irregular in shapes and arrangement. The diffusion reflectors 2, as shown in FIG. 2B, are formed by first reflecting underlayers 21 formed on the first transparent substrate 1 in an unevenness distribution and projecting curved second underlayers 22 formed on the first reflecting underlayers. On the second reflecting underlayers 22, projecting curved reflecting layers 23 are formed. The reflecting films 23 are formed by rhodium, titanium, chrome, silver, aluminum, chromel, or other metal films, in particular the high reflectance silver.

The transparent window 3 is formed for passing light from the backlight etc. The backlight is provided at the other surface of the first transparent substrate 1 than the surface where the liquid crystal layer 31 is arranged. Light emitted from the backlight passes though the transparent window 3. In the present embodiment, the transparent window 3 is formed at the first transparent substrate 1 near the diffusion reflectors 2.

Here, the diffusion reflectors 2 and the transparent window 3 are formed so that a first distance A of the liquid crystal layer 31 between the diffusion reflectors 2 and the second transparent substrate 11 is smaller than a second distance B of the liquid crystal layer 31 between the second transparent substrate 11 and the transparent window 3. In particular, in the present embodiment, they are formed so that the first distance A is substantially half of the second distance B. Further, the diffusion reflectors 2 and the transparent window 3 are formed over them with ITO pixel electrodes.

The color filter 40 is formed over the entire region of the second transparent substrate 11 facing the first transparent substrate 1 formed with the diffusion reflectors 2 and the transparent window 3 and passes and colors front light and back light. The color filter 40 is formed by polyimide or another resin colored by a pigment or dye. For example, it is formed using the primary colors of red, green, and blue as a group. Further, the second transparent substrate 11 is formed, via a transparent protective film (not shown) protecting the color filter 40, with ITO counter electrodes facing the pixel electrodes.

Next, a method of producing a liquid crystal display device according to the present embodiment will be explained. FIGS. 3A to 3E are schematic cross-sectional views showing steps of forming the diffusion reflectors 2 and the transparent window 3 at the first transparent substrate 1 according to the method of producing a liquid crystal display device of the present embodiment.

Before forming the diffusion reflectors 2 and the transparent window 3 at the first transparent substrate 1, the first transparent substrate 1 is formed with TFTs (not shown) of bottom gate structures as follows. First, the first transparent substrate 1 is formed with gate electrodes of molybdenum, tantalum, or other conductive materials by sputtering. The gate electrodes are covered with a gate insulating film, then the gate insulating film is formed with polycrystalline silicon or other semiconductor film. The semiconductor film is formed at parts for forming channels with stopper layers made of silicon oxide. Regions of the semiconductor film for forming sources and drains are doped with impurities by self-alignment to thereby form TFTs having bottom gate structures.

The TFTs are covered by formation of an interlayer insulating film (not shown). The interlayer insulating film is etched to form apertures and is formed with source electrodes connecting to the sources of the TFTs and drain electrodes connecting to the drains of the TFTs.

Figure 3A:
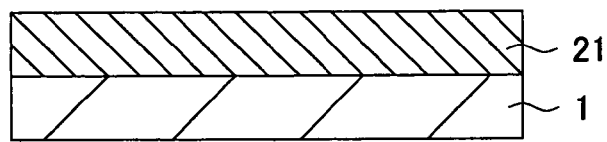
FIGS. 3A to 3E are cross-sectional views of steps of a method of producing a liquid crystal display device according to the first embodiment of the present invention.
Figure 3B:
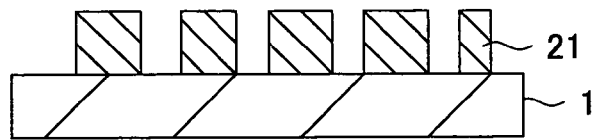

Then, as shown in FIG. 3A, the first transparent substrate 1 for forming the diffusion reflectors 2 and the transparent window 3 is formed at an entire predetermined region with a first reflecting underlayer 21 of a photoresist material to a predetermined thickness. Next, as shown in FIG. 3B, the first reflecting underlayer 21 is patterned to form projections in an unevenness distribution at the surface of the first transparent substrate 1.

Figure 3C:
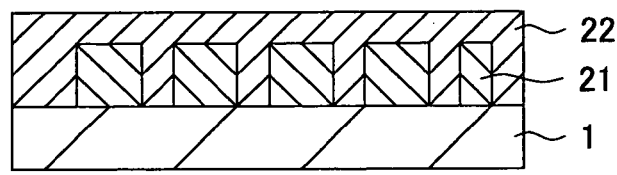
Figure 3D:
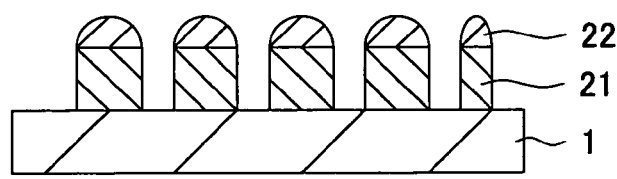

Then, as shown in FIG. 3C, the first transparent substrate 1 formed with the first reflecting underlayers 21 in an unevenness distribution is covered entirely with a second reflecting underlayer 22 of a photoresist material to a predetermined thickness. Next, as shown in FIG. 3D, the second reflecting underlayer 22 is patterned to form projections in the same way as the first reflecting underlayers 21. These are then heat treated to make the second reflecting underlayers 22 deform in shape so as to make the surfaces of the second reflecting underlayers 22 gentle curves.

Note that, in the present embodiment, to make the surfaces gentle curves so as to diffuse and reflect light efficiently, the two reflecting underlayers of the first reflecting underlayer 21 and the second reflecting underlayer 22 are formed. However, depending on the desired diffusion and reflection performance, a single reflecting underlayer is also possible.

Figure 3E:
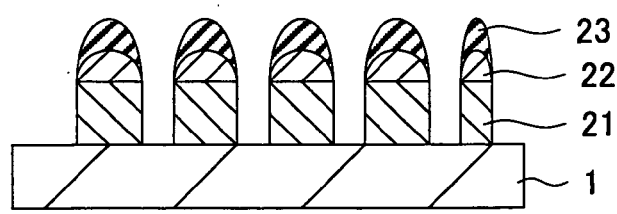

Next, as shown in FIG. 3E, the second reflecting underlayers 22 are formed over their surfaces with reflecting films 23 using silver. The regions formed with the reflecting films 23 become the diffusion reflectors 2, while the regions surrounding the diffusion reflectors 2 with no reflecting films 23 form the transparent window 3. The first distance A of the liquid crystal layer 31 between the second transparent substrate 11 and the diffusion reflectors 2 formed by the first reflecting underlayers 21, the second reflecting underlayers 22, and the reflecting films 23 is formed to become smaller than the second distance B of the liquid crystal layer 31 between the second transparent substrate 11 and the transparent window 3. In the present embodiment, the diffusion reflectors 2 are formed set to thicknesses so as to make the first distance A substantially half the second distance B.

After this, the first transparent substrate 1 formed with the diffusion reflectors 2 and the transparent window 3 is formed with ITO pixel electrodes (not shown) connecting to the drain electrodes of the TFTs by sputtering to form the TFT array.

On the other hand, the second transparent substrate 11 is formed with the color filter 40. The second transparent substrate 11 is coated and patterned with polyimide or another resin in which pigments or dyes are dispersed to form the color filter 40. The color filter 40 is formed with a transparent protective film (not shown) and is then formed with ITO counter electrodes facing the pixel electrodes.

Further, the first transparent substrate 1 formed with the pixel electrodes and the second transparent substrate 11 formed with the counter electrodes are formed with orientation films (not shown) and oriented. The first transparent substrate 1 and the second transparent substrate 11 are provided between them with spacers and bonded with them using a sealant. Here, they are bonded so as to make the first distance A of the liquid crystal layer 31 between the second transparent substrate 11 and the diffusion reflectors 2 substantially half the second distance B of the liquid crystal layer 31 between the second transparent substrate 11 and the transparent window 3. The first transparent substrate 1 and the second transparent substrate 11 are filled with liquid crystals for forming the liquid crystal layer 31 and sealed to form a liquid crystal panel.

Then, quarter wavelength plates, polarizing plates, a backlight, and drive circuit are arranged to form the liquid crystal display device.

The liquid crystal display device of the present embodiment diffuses and reflects front light incident from the second transparent substrate 11 side via the liquid crystal layer 31 by the diffusion reflectors 2 formed at the first transparent substrate 1 in an unevenness distribution. The liquid crystal display device passes back light incident from the other side of the first transparent substrate 1 than where the liquid crystal layer 31 is arranged through the transparent window 3 near the diffusion reflectors 2 formed at the first transparent substrate 1 in an unevenness distribution.

Figure 1A:
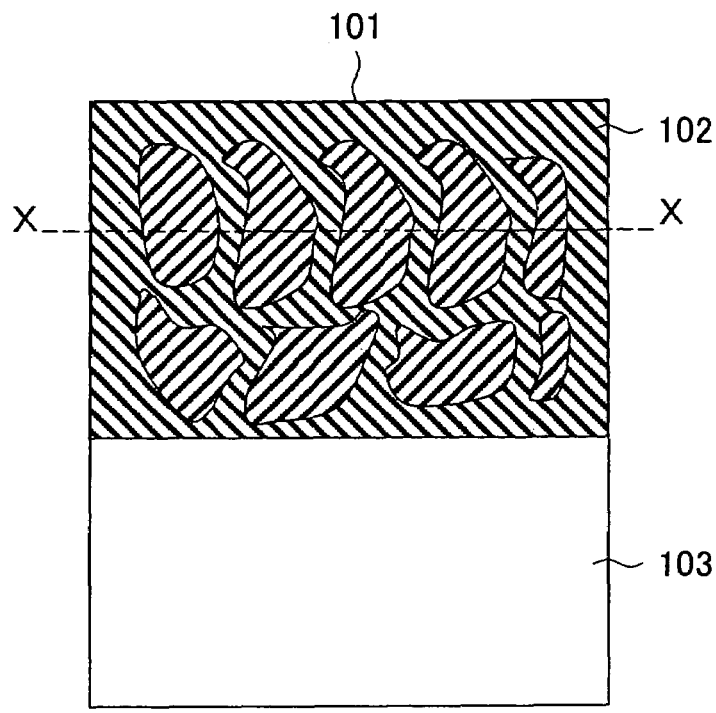
FIG. 1A is a plane view of a surface of a first transparent substrate of a liquid crystal display device according to the related art.
Figure 1B:
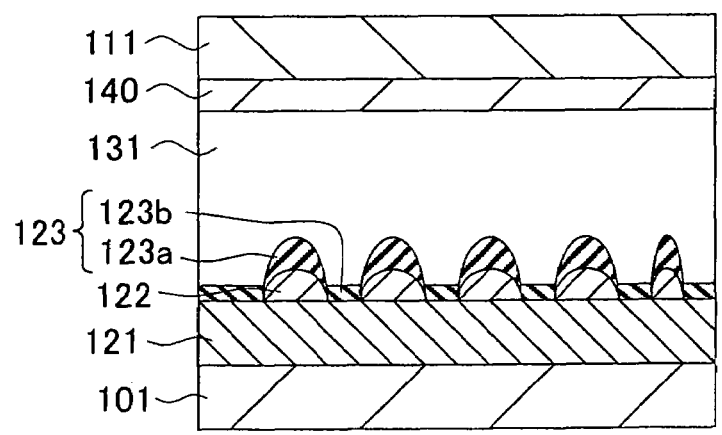
FIG. 1B is a cross-sectional view along the line X-X of FIG. 1A.

The liquid crystal display device of the present embodiment for example has diffusion reflectors 2 covering 70% of its surface and the transparent window covering 30%. When compared with the liquid crystal display device of the related art shown in FIGS. 1A and 1B, the reflectance of the liquid crystal display device of the related art was 5%, while the reflectance of the liquid crystal display device of the present embodiment was about 7%. Therefore, in the present embodiment, the reflectance is improved about 40% compared with the related art even if the transparent window 3 is reduced in size and without reducing the transmittance.

When viewing a display using reflection, ambient light incident by an angle of about 20 to 30 degrees in a direction perpendicular to the surface of the first transparent substrate 1 is diffused and reflected to the front to enable viewing of the display. Therefore, the reflection at the regions of easy regular reflection of the diffusion reflectors 2 is not used for the display. Here, most of the regions surrounding the diffusion reflectors 2 in an unevenness distribution are perpendicular to light incident to the first transparent substrate 1 and easily regularly reflect light. The easily regular reflecting regions surrounding the diffusion reflectors 2 are formed with the transparent window 3 in the present embodiment. Therefore, as explained above, the reflectance of diffused and reflected front light and the transmission of back light can be improved together in the present embodiment.

Further, the diffusion reflectors 2 and the transparent window 3 are formed so that the first distance A of the liquid crystal layer 31 between the second transparent substrate 11 and the diffusion reflectors 2 is smaller than the second distance B of the liquid crystal layer 31 between the second transparent substrate 11 and the transparent window 3. In particular, the first distance A is substantially half of the second distance B in the present embodiment.

Figure 4:
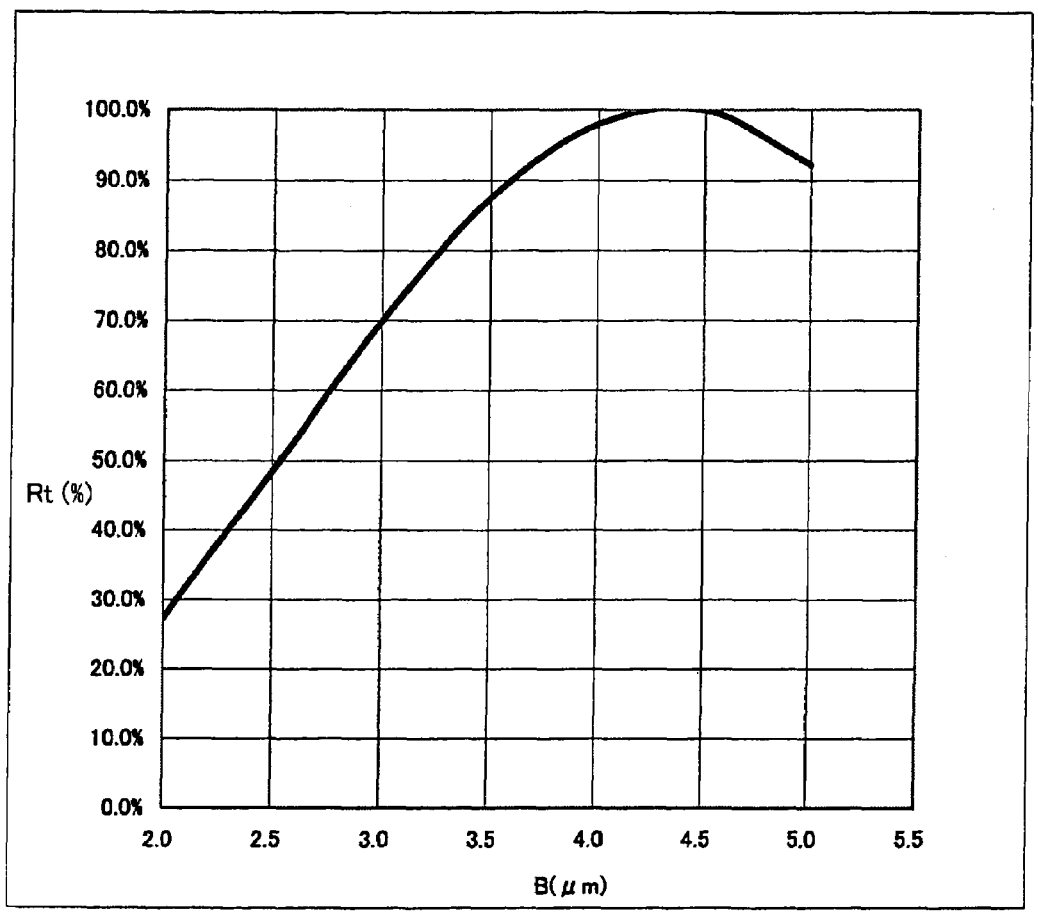
FIG. 4 is a graph of the relation between a second distance B of the liquid crystal layer and a transmittance Rt at transparent window of the liquid crystal display device according to the first embodiment of the present invention.

FIG. 4 is a graph showing the transmittance Rt (%) in the case of making the first distance A of the liquid crystal layer 31 between the second transparent substrate 11 and the diffusion reflectors 2 2 μm and changing the second distance B (μm) of the liquid crystal layer 31 between the second substrate 11 and the transparent window 3. As shown in this graph, when the second distance B is larger than the first distance A, that is, the first distance A is smaller than the second distance B, the transmittance is improved. When making the second distance B about 3.5 to 5.0 μm compared with a first distance A of 2 μm, a transmittance Rt of at least 90% can be obtained.

In this way, in the present embodiment, since the first distance A is made smaller than the second distance B, the transmittance can be improved. Further, by making the first distance A smaller than the second distance B, the lengths of the light paths of the front light reflected at the diffusion reflectors 2 and the back light passing through the transparent window 3 become close to each other, so even in display by reflection, the luminance can be improved and the viewability can be improved. Further, since the first distance A is made half of the second distance B, a higher transmittance is obtained. Further, by making the first distance A half of the second distance B, the lengths of the light paths of the front light reflected at the diffusion reflectors 2 and the back light passing through the transparent window 3 become substantially the same. As a result, even with display by reflection, the viewability can be further improved.

Therefore, the present embodiment enables the reflectance and the transmittance to be improved in a transflective liquid crystal display device. As a result, it is possible to improve the luminance, contrast, and viewability of a color display.

Second Embodiment

Figure 5A:
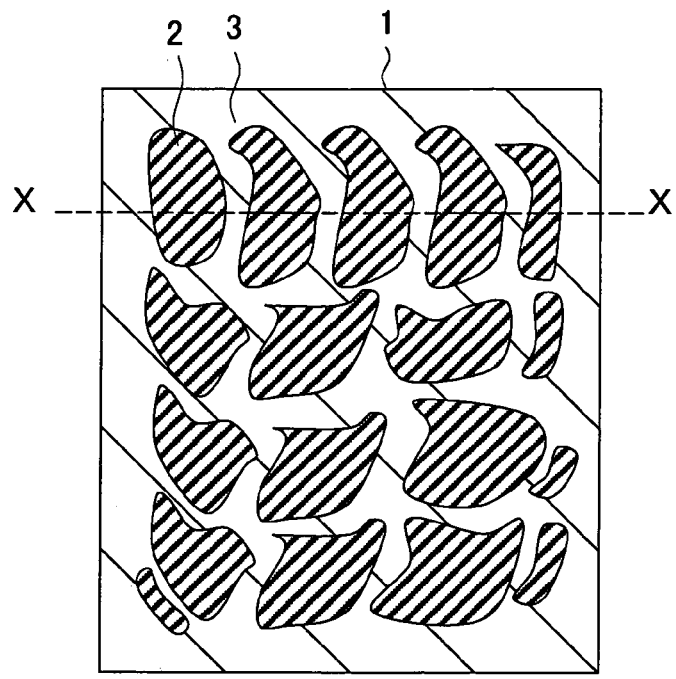
FIG. 5A is a plane view of a surface of a first transparent substrate of a liquid crystal display device according to a second embodiment of the present invention.
Figure 5B:
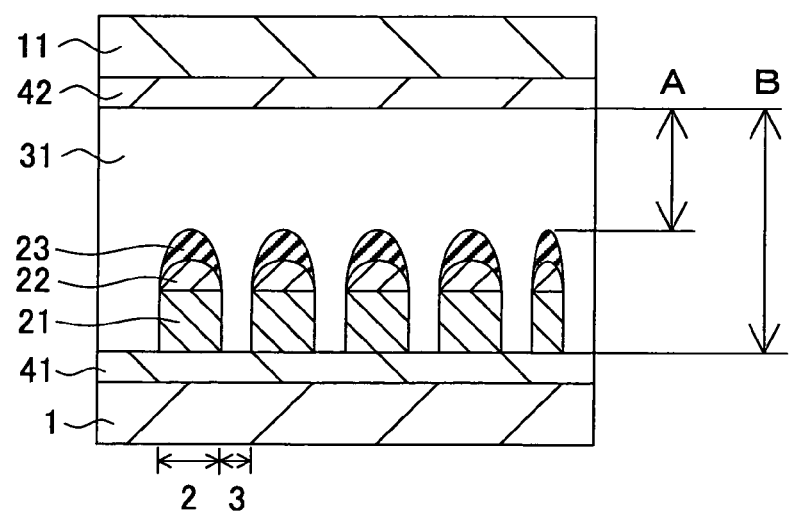
FIG. 5B is a cross-sectional view along the line X-X of FIG. 5A.

FIGS. 5A and 5B are views of a liquid crystal display device of the second embodiment. Specifically, FIG. 5A is a plane view of a surface of a first transparent substrate 1, while FIG. 5B is a cross-sectional view of the first transparent substrate 1 and a second transparent substrate 11 facing the first transparent substrate 1 along the line X-X of FIG. 5A.

The present embodiment differs from the first embodiment in that the first transparent substrate 1 is formed with a first color filter 41, while the second transparent substrate 11 is formed with a second color filter 42. Further, diffusion reflectors 2 are formed between the first color filter 41 and the second color filter 42. Except for forming the first color filter 41 at the first transparent substrate 1, this embodiment is the same as the first embodiment. Therefore, explanations of similar portions are omitted.

As shown in FIGS. 5A and 5B, the liquid crystal display device of the present embodiment has the first transparent substrate 1, the second transparent substrate 2, a liquid crystal layer 31, diffusion reflectors 2, a transparent window 3, the first color filter 41, and the second color filter 42. The second transparent substrate 11 is facing and arranged to the first transparent substrate 1, while the liquid crystal layer 31 is arranged between the first transparent substrate 1 and the second transparent substrate 11. The first transparent substrate 1 is formed with the diffusion reflectors 2 and the transparent window 3 in the same way as the first embodiment.

The first transparent substrate 1 is formed over the entire region of the diffusion reflectors 2 and the transparent window 3 with the first color filter 41 passing and coloring back light. The second transparent substrate 11 facing the first transparent substrate 1 is formed over the entire region facing the diffusion reflectors 2 and the transparent window 3 of the first transparent substrate 1 with the second color filter 42 passing and coloring front light and back light. The first color filter 41 and the second color filter 42 are formed in the primary colors of red, green, and blue as a group similar to the first embodiment. The first color filter 41 and the second color filter 42 have similar primary colors and concentrations at facing positions.

Next, a method of producing a liquid crystal display device according to the present embodiment will be explained. In the present embodiment, the first transparent substrate 1 is formed in advance with the first color filter 41 similar to the color filter of the first embodiment. Then, the first color filter 41 of the first transparent substrate 1 is formed over it with the diffusion reflectors 2 and the transparent window 3 by a method similar to the first embodiment. The second transparent substrate 11 is similarly formed with the second color filter 42.

Then, similar to the first embodiment, the first transparent substrate 1 and the second transparent substrate 11 are bonded together to form the liquid crystal display device.

The liquid crystal display device of the present embodiment diffuses and reflects front light from the surroundings by the diffusion reflectors 2 formed at the first transparent substrate 1 in an unevenness distribution similar to the first embodiment. The liquid crystal display device passes light from the backlight by the transparent window 3 formed at the first transparent substrate 1 near the diffusion reflectors 2 in an unevenness distribution.

When the liquid crystal display device of the present embodiment, like in the first embodiment, has diffusion reflectors 2 covering 70% of its surface and a transparent window covering 30% of its surface, the reflectance of the liquid crystal display device of the present embodiment was about 7%. In the present embodiment, similar to the first embodiment, the reflectance is improved about 40% compared with the related art without detracting from the transmittance. Therefore, in the present embodiment, since the easily regular reflecting regions near the diffusion reflectors 2 are formed with the transparent window 3, the reflectance of the diffused and reflected front light and the transmittance of back light can be improved together.

In the liquid crystal display device of the present embodiment, front light from the surroundings passes through the second color filter 42 of the second transparent substrate 11 and is diffused and reflected at the diffusion reflectors 2. The diffused and reflected front light then passes through the second color filter 42 of the second transparent substrate 11 from the back surface side. On the other hand, light emitted from the backlight passes through the first color filter 41 of the first transparent substrate 1 and passes through the second color filter 42 of the second transparent substrate 11. Therefore, front light and back light pass through and are colored by the color filter two times in the present embodiment. As a result, even when used as a transflective type using both front light and back light, the color reproducibility can be easily improved.

Further, in the present embodiment, since the first transparent substrate 1 and the second transparent substrate 11 are formed with color filters and the color filters are not provided with differences in coloring concentration in the plane of the color filters as in the related art, a fine-machining is not necessary and the production efficiency can be improved.

Therefore, in the present embodiment, it is possible to improve the luminance and contrast to improve the viewability, color reproducibility, etc. even in color display and to improve production efficiency in a transflective liquid crystal display device.

Third Embodiment

Figure 6A:
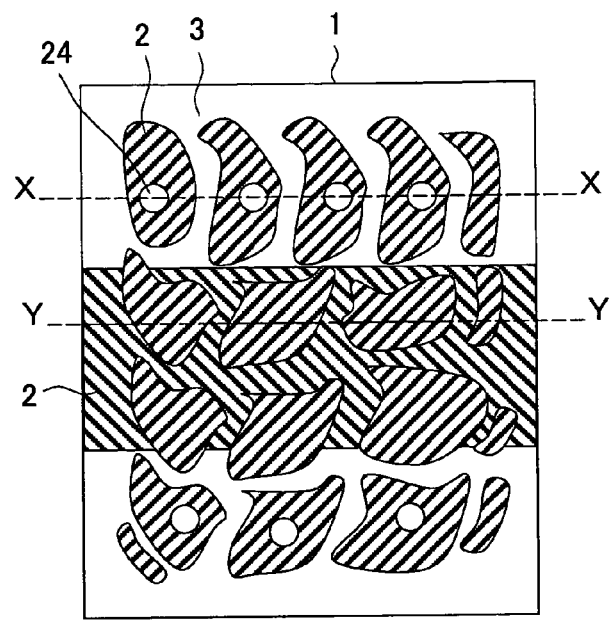
FIG. 6A is a plane view of a surface of a first transparent substrate of a liquid crystal display device according to a third embodiment of the present invention.
Figure 6B:
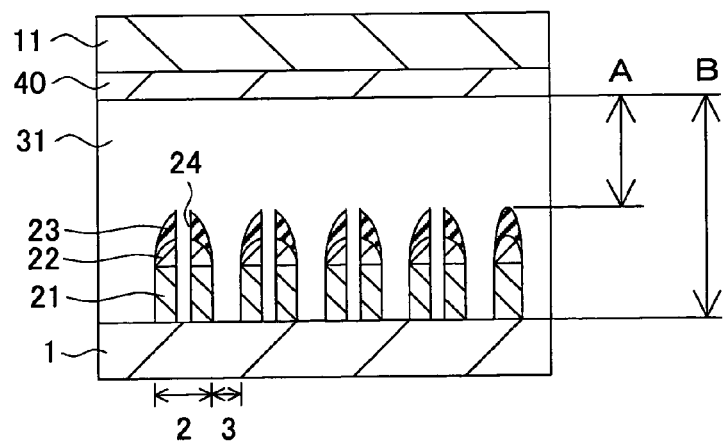
FIG. 6B is a cross-sectional view along the line X-X of FIG. 6A.
Figure 7A:
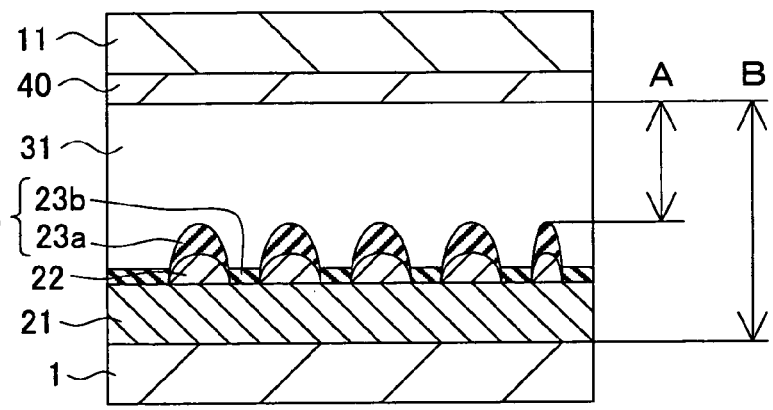
FIG. 7A is a cross-sectional view along the line Y-Y of FIG. 6A.
Figure 7B:
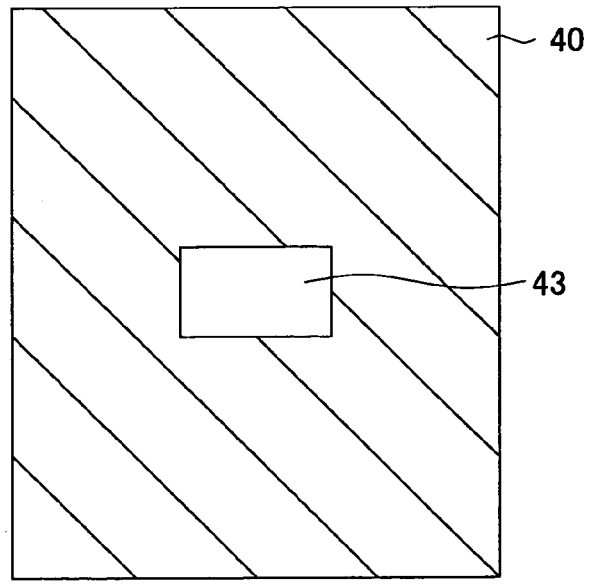

FIGS. 6A and 6B and FIGS. 7A and 7B are views of a liquid crystal display device of the third embodiment. Specifically, FIG. 6A is a plane view of the surface of a first transparent substrate, and FIG. 6B is a cross-sectional view of the first transparent substrate 1 and a second transparent substrate 11 facing the first transparent substrate 1 along the line X-X of FIG. 6A. Further, FIG. 7A is a cross-sectional view of the first transparent substrate 1 and the second transparent substrate 11 facing the first transparent substrate 1 along the line Y-Y of FIG. 6A, and FIG. 7B is a plane view of a color filter 40 formed at the second transparent substrate 11.

The present embodiment differs from the first embodiment in that parts of the diffusion reflectors 2 are formed with diffusion reflection apertures 24. In the diffusion reflectors 2 in an unevenness distribution of the present embodiment, there are regions formed with the transparent window 3 surrounding them and regions not formed with it. The color filter 40 of the second transparent substrate is formed with color filter apertures 43 corresponding to the diffusion deflectors at the regions where the transparent window 3 is not formed. Except for forming the diffusion reflection apertures 24 and the color filter apertures 43, the liquid crystal display device of the present embodiment is the same as the first embodiment. Therefore, explanations of similar portions are omitted.

As shown in FIG. 6A and 6B and FIG. 7A and 7B, the liquid crystal display device of the present embodiment has the first transparent substrate 1, the second transparent substrate 11, a liquid crystal layer 31, the diffusion reflectors 2, the transparent window 3, and the color filter 40. The second transparent substrate 11 is facing and arranged to the first transparent substrate 1, and the liquid crystal layer 31 is arranged between the first transparent substrate 1 and the second transparent substrate 11.

As shown in FIG. 6A, the first transparent substrate 1 has regions formed with the transparent window 3 surrounding the diffusion reflectors 2 in an unevenness distribution and a region where the transparent window 3 is not formed.

FIG. 6B shows a region formed with the transparent window 3 surrounding the diffusion reflectors 2 in an unevenness distribution. The diffusion reflectors 2 and the transparent window 3 of the region shown are similar to those in the first embodiment. The diffusion reflectors 2 are formed by first reflecting underlayers 21 formed on the first transparent substrate 1 in an unevenness distribution and projecting curved second reflecting underlayers 22 formed on the first reflecting underlayers 21. Further, the second reflecting underlayers 22 are formed with projecting curved reflecting films 23. Further, the diffusion reflectors 2 are formed with diffusion reflection apertures 24 so as to pass back light. The diffusion reflection apertures 24 are parts of the diffusion reflectors 2 and are formed so as to include the tops of the curved projecting diffusion reflectors 2.

FIG. 7A shows the region where the transparent window 3 is not formed surrounding the diffusion reflectors 2 in an unevenness distribution. The diffusion reflectors 2 of this region are similar to those of the liquid crystal display device of the related art shown in FIG. 1. The diffusion reflectors 2 diffuse and reflect light by being formed by a flat first reflecting underlayer 21 formed on the first transparent substrate 1 and curved second reflecting underlayers 22 formed on top of this in an unevenness distribution. Further, the first reflecting underlayer 21 and the second reflecting underlayers 22 are covered by a reflecting film 23 having flat reflecting films 23b and curved projecting reflecting films 23a.

As shown in FIG. 7B, the second transparent substrate 11 is formed over the entire region of the diffusion reflectors 2 and the transparent window 3 with a color filter 40 passing and coloring front light and back light. The color filter 40 is formed with color filter apertures 43 at positions facing the diffusion reflectors 2 of the region where the transparent window 3 is not formed so as to pass front light. The color filter apertures 43 are formed in rectangular shapes.

Next, a method of producing a liquid crystal display device according to the present embodiment will be explained.

In the regions where the transparent window 3 is formed surrounding the diffusion reflectors 2 in an unevenness distribution, the diffusion reflectors 2 and the transparent window 3 are formed in the same way as the first embodiment. First, the first transparent substrate 1 is formed over it with first reflecting underlayers 21 using a photoresist material in an unevenness distribution. The first reflecting underlayers 21 are formed with projecting curved second reflecting underlayers 22 using a photoresist material by patterning and heat treatment. The second reflecting underlayers 22 are formed over them with projecting curved reflecting films 23 using silver to thereby form the diffusion reflectors 2 in an unevenness distribution. Then, parts of the diffusion reflectors 2 are etched including their tops to form aperture for passing back light to thereby form the diffusion reflection apertures 24.

In the region where the transparent window 3 is not formed surrounding the diffusion reflectors 2 in an unevenness distribution, the diffusion reflectors 2 are formed in the same way as the first embodiment. First, the first transparent substrate 1 is formed over it with a flat first reflecting underlayer 21 using a photoresist material. The first reflecting underlayer 21 is formed over it with projecting curved second reflecting underlayers 22 in an unevenness distribution using photoresist materials by patterning and heat treatment. The first reflecting underlayer 21 and the second reflecting underlayers 22 are covered by forming the reflecting films 23 having the projecting curved reflecting films 23a and the flat reflecting films 23b using silver.

Then, the second transparent substrate 11 is formed with a color filter 40 corresponding to the regions where the diffusion reflectors 2 and the transparent window 3 are formed. In the same way as the first embodiment, the second transparent substrate 11 is coated and patterned with a polyimide or other resin in which a pigment or dye to form the color filter 40. The color filter 40 is formed with rectangular holes so as to pass front light at positions facing the diffusion reflectors 2 in the region where the transparent window 3 is not formed and thereby form the color filter apertures 43.

Then, similar to the first embodiment, the first transparent substrate 1 and the second transparent substrate 11 are bonded to form a liquid crystal display device.

The liquid crystal display device of the present embodiment, like the first embodiment, diffuses and reflects front light from the surroundings by the diffusion reflectors 2 formed at the first transparent substrate 1 in an unevenness distribution. The transparent window 3 formed at the first transparent substrate 1 around the diffusion reflectors 2 in an unevenness distribution passes light from the backlight. Light from the backlight passes through not only the transparent window 3, but also the parts of the diffusion reflectors 2 constituted by the diffusion reflection apertures 24 formed so as to include the tops of the curved projecting diffusion reflectors 2.

When the liquid crystal display device of the present embodiment, like in the first embodiment, has diffusion reflectors 2 covering 70% of its surface and a transparent window covering 30% of its surface, the reflectance of the liquid crystal display device of the present embodiment was about 7%. In the present embodiment, similar to the first embodiment, the reflectance is improved about 40% compared with the related art without detracting from the transmittance.

The diffusion reflectors 2 in an unevenness distribution, for example, include easily regular reflecting parts with large surfaces perpendicular to the light perpendicularly incident on the first transparent substrate 1 such as the tops at the projecting curved surfaces of the diffusion reflectors 2. In the present embodiment, the easily regular reflecting regions of both the parts of the diffusion reflectors 2 in an unevenness distribution and the surroundings of the diffusion reflectors 2 are made to pass the back light by being formed with the diffusion reflection apertures 24 and the transparent window 3. As a result, the liquid crystal display device of the present embodiment can improve the reflectance of diffused and reflected front light and the transmittance of back light together.

In the liquid crystal display device of the present embodiment, front light from the surroundings passes through the color filter 40 of the second transparent substrate 11 and is diffused and reflected at the diffusion reflectors 2. The diffused and reflected front light then passes through the color filter of the second transparent substrate 11 from the back surface side. However, the color filter 40 of the present embodiment is formed with the color filter apertures 43 at positions facing the diffusion reflectors. As a result, a part of the reflected front light passes through the color filter apertures 43 and is not colored by the color filter 40. Therefore, the liquid crystal display device of the present embodiment can improve the viewability even when the surroundings are dark due to utilizing part of the reflected front light free from coloring.

Therefore, the present embodiment can improve the transmittance and the reflectance in a transflective liquid crystal display device and as a result can improve the luminance and contrast and improve the viewability of color display.

While the invention has been described with reference to specific embodiments chosen for purpose of illustration, it should be apparent that numerous modifications could be made thereto by those skilled in the art without departing from the basic concept and scope of the invention.

For example, the color filter apertures may be formed in an unevenness distribution at a color filter corresponding to the light diffusion regions in an unevenness distribution.

Summarizing the effects of the invention, according to the present invention, it is possible to provide a liquid crystal display device improved in luminance and contrast to enable better viewability and color reproduction and able to improve the production efficiency.

What is claimed is:

1. A liquid crystal display device comprising:
   a first transparent substrate;
   a second transparent substrate facing said first transparent substrate in spaced-apart relationship;
   a color filter formed at said second transparent substrate and passing light; and
   a liquid crystal layer between said first transparent substrate and said second transparent substrate,
   wherein,
   said first transparent substrate comprises a plurality of diffusion reflectors projecting from a surface of said first transparent substrate for diffusing and reflecting front light incident from said second transparent substrate side via said color filter and said liquid crystal layer, said diffusion reflectors being formed in an uneven distribution across the surface of the first transparent substrate and being spaced apart from each other along said first transparent substrate,
   said first transparent substrate provides a transparent window for passing light surrounding said diffusion reflectors at portions from which said diffusion reflectors do not project,
   said color filter is formed with color filter apertures formed so as to pass light at positions facing said diffusion reflectors, and
   each one of said plurality of diffusion reflectors is formed by a first reflecting underlayer formed on said first transparent substrate in said uneven distribution, a second reflecting underlayer formed on the first reflecting underlayer and having a curved upper surface, and a projecting curved third reflecting layer formed on the second reflecting underlayer.

2. A liquid crystal display device as set forth in claim 1, wherein a first distance of said liquid crystal layer between said second transparent substrate and said diffusion reflectors is smaller than a second distance of said liquid crystal layer between said second transparent substrate and said transparent window.

3. A liquid crystal display device as set forth in claim 1, wherein said first distance is a half of said second distance.

4. A liquid crystal display device as set forth in claim 1, wherein said diffusion reflectors are formed at parts with diffusion reflection apertures so as to pass light.

5. A liquid crystal display device as set forth in claim 1, further comprising:
   another color filter formed at said first transparent substrate and passing back light incident from a direction facing said front light such that the plurality of diffusion reflectors is formed between the color filter formed at said second transparent substrate and the another color filter formed at said first transparent substrate.

6. A liquid crystal display device comprising a plurality of pixels, each of which comprises:
   a first transparent substrate or portion thereof;
   a second transparent substrate or portion thereof facing said first transparent substrate in spaced-apart relationship;
   a color filter formed at said second transparent substrate and passing light; and
   a liquid crystal layer between said first transparent substrate and said second transparent substrate,
   wherein,
   said first transparent substrate or portion thereof comprises a plurality of diffusion reflectors projecting from a surface of said first transparent substrate for diffusing and reflecting front light incident from said second transparent substrate side via said liquid crystal layer, said diffusion reflectors being formed in an uneven distribution across the surface of the first transparent substrate and being spaced apart from each other along said first transparent substrate,
   said first transparent substrate or portion thereof provides a transparent window for passing light surrounding said diffusion reflectors at portions from which said diffusion reflector do not project,
   said color filter is formed with color filter apertures formed so as to pass light at positions facing said diffusion reflectors, and
   each one of said plurality of diffusion reflectors is formed by a first reflecting underlayer formed on said first transparent substrate in said uneven distribution, a second reflecting underlayer formed on the first reflecting underlayer and having a curved upper surface, and a projecting curved third reflecting layer formed on the second reflecting underlayer.

7. A liquid crystal display device as set forth in claim 6, further comprising:
   another color filter formed at said first transparent substrate and passing back light incident from a direction facing said front light, such that the plurality of diffusion reflectors is formed between the color filter formed at said second transparent substrate and the another color filter formed at said first transparent substrate.

* * * * *